United States Patent [19]

Suzzi

[11] 3,939,994

[45] Feb. 24, 1976

[54] STACKING APPARATUS

[75] Inventor: Gianoberto Suzzi, Modena, Italy

[73] Assignee: Riva Calzoni S.p.A., Milan, Italy

[22] Filed: Jan. 22, 1975

[21] Appl. No.: 543,109

[30] Foreign Application Priority Data
Jan. 23, 1974   Italy.................................. 67177/74

[52] U.S. Cl. ................ 214/6 M; 214/6 H; 214/6 P
[51] Int. Cl.² ........................................ B65G 57/04
[58] Field of Search ........... 214/6 M, 6 H, 6 P, 6 G, 214/6 F

[56] References Cited
UNITED STATES PATENTS

| 2,869,737 | 1/1959 | Thomas............................. 214/6 P |
| 3,517,831 | 6/1970 | Hahn............................. 214/6 M X |

FOREIGN PATENTS OR APPLICATIONS

| 104,163 | 6/1964 | Norway.............................. 214/6 M |
| 216,746 | 8/1961 | Austria............................. 214/6 M |

Primary Examiner—Robert J. Spar
Assistant Examiner—Leslie J. Paperner
Attorney, Agent, or Firm—Sughrue, Rothwell, Mion, Zinn & Macpeak

[57] ABSTRACT

Asbestos sheets are delivered from a forming machine to a stacking station at which the sheets are interleaved with flat or corrugated patterns before passing on to a seasoning store. The sheets and the patterns are carried on respective trolleys which move along guideways and through a transfer mechanism to a stack forming station. An auxiliary guideway is mounted above the guideway for the trolleys which carry the mixed stack, this auxiliary guideway being disengageable from the trolleys, for example by separating the auxiliary guideway rails, to allow an elevator at the stacking station to lower the stack carrying trolley to floor level, the auxiliary guideway then being reformed to receive a further trolley upon which a stack is formed while the first stack-carrying trolley is removed at floor level, so that stacking of the sheets can take place uninterruptedly.

4 Claims, 5 Drawing Figures

STACKING APPARATUS

BACKGROUND OF THE INVENTION

This invention relates to stacking apparatus for asbestos sheets.

In the manufacture of flat or corrugated asbestos cement sheets, it is known to stack the sheets immediately after moulding them, and therefore while they are still fresh, on trolleys and to interleave the sheets with plate-like patterns, generally consisting of flat or corrugated metal sheets, which are delivered to the stacking station by means of other trolleys. In this manner, mixed stacks of a determined number of sheets interleaved with patterns are formed.

The present invention is concerned with apparatus for stacking asbestos cement sheets interleaved with patterns of the kind comprising feeding means for feeding fresh asbestos cement sheets, first and second flanking guideways for guiding respectively pattern-carrying trolleys and trolleys carrying mixed stacks of sheets interleaved with patterns, a bridge structure arranged above said guideways and said feeding means, a carriage displaceably mounted on the said bridge structure and provided with respective suction boxes for picking-up, transporting, and depositing the said sheets and the patterns, a trolley elevator in the area of formation of the stack of interleaved sheets and patterns, and a transfer device for transferring the said trolleys from one to the other of the said guideways, outside the bridge structure.

It is known in the context of mass production of asbestos sheets to provide elevators with automatic controls to keep constant both the upper level of the mixed stack of sheets and patterns and the upper level of the patterns alone, so as to limit the vertical travel of the suction boxes which pick up the sheets and patterns thus speeding-up the working cycle of the stacking apparatus.

In known apparatus of the kind described above, when a trolley for carrying a pattern is empty, the following operations are effected:

i. lowering of the elevator to a level where the empty pattern-carrying trolley is placed on the respective guideway;

ii. moving a trolley loaded with patterns to a location under the respective pick-up suction box, and further removal of the empty trolley from the operational area of the said suction box, and iii. raising the elevator so as to bring the upper level of the stack of pattern plates on the trolley, to the level predetermined relatively to the pick-up suction box.

These three operations must be effected in an interval of time shorter than that required by the associated sheet manufacturing machine to produce a single sheet, since it would otherwise be necessary to lose one or more sheets by consigning them to a kneading machine to recover the material of the sheets.

Similarly, when the formation of a stack of sheets and patterns is completed on a trolley, that is to say, when the last of a predetermined number of sheets has been placed on the top of the stack, it is necessary to carry out the following operations:

i. moving of a pattern picked-up from the pattern-carrying trolley, and placing it on the top of the stack of sheets and patterns, since it is known that the stack must be topped by a pattern;

ii. lowering of the elevator to bring the mixed stack on the trolley onto the respective guideway;

iii. moving of a trolley, which is empty, except for one pattern, under a pick-up suction box, for positioning of the sheets and subsequent removal of the trolley loaded with sheets and patterns, and iv. raising of the elevator, to bring the upper level of the empty trolley to the level predetermined with respect to the relevant suction box.

These four operations must be effected in a shorter period of time than that required by the machine to produce one sheet, otherwise wastage occurs. In practice, the time available to effect the last three operations is little more than half the time taken to produce one sheet, which in effect, is a very short time for carrying out these operations satisfactorily.

The above two series of operations related to the pattern carrying trolley and the mixed-stack trolley generally take place at different times, and therefore, the loss of even a single sheet at every trolley changing operation, entails a loss of at least two sheets for every cycle of loading a trolley with sheets and patterns.

Apart from the loss of productivity with such known apparatus, there is the further disadvantage caused by the introduction into the asbestos cement mixture of a considerable amount of reclaimed material coming from the waste sheets, which adversely alters the mixture, and increases the difficulty of operating a continuous, automatic machine for the production of sheets, with consequent loss of product quality.

Since in the operations relating to the changing of the pattern carrying trolleys, more time is available than in the case of the mixed stack carrying trolleys, it may be thought possible to shorten the changing time of the trolleys by increasing their speed of travel. However, this solution is not possible in practice, because the introduction of significant accelerations would cause the patterns, which are lubricated over their entire areas, to slide one upon the other, and damage their extremities by knocking against the aligning stops of the pattern stack. Similar trouble would also be experienced with the trolleys carrying the mixed sheets and patterns, the height of which sometimes exceeds one meter.

In consequence, even with the most advanced conventional equipment, with a high rate of production of asbestos sheets, it is not possible to effect a change of trolleys without the loss of at least one sheet.

The object of this invention is to eliminate the loss of sheets when changing trolleys, while maintaining a high rate of production of fresh sheets.

SUMMARY OF THE INVENTION

According to the invention, there is provided an apparatus for stacking sheets of asbestos cement, of the kind referred to above, wherein the improvement consists in the provision at the station where the mixed stack of sheets and patterns is formed on the respective trolley, under the bridge structure, of a section of auxiliary guideway, disposed above the second guideway for the mixed stack-carrying trolley, at a higher level than the maximum height attainable by the top of the mixed stack when said trolley is on said second guideway, and in the provision of means for disengaging the section of auxiliary guideway from the trolley when the latter is engaged by the said elevator.

In an advantageous preferred feature of the invention, the guideway for the trolleys carrying the patterns, at least in the section under the bridge structure, and the section of guideway supported by the said transfer unit, are on the same level as the said section of auxiliary guideway, to further expedite the changing of the trolleys.

BRIEF DESCRIPTION OF THE DRAWINGS

The invention will now be described, by way of example, with reference to the appended drawing, which illustrates one embodiment of the invention, in which.

DETAILED DESCRIPTION OF THE ILLUSTRATED EMBODIMENTS

With reference to the above-mentioned drawings, the stacking apparatus illustrated by way of example, is of the four station type, already known in the prior art as far as its general characteristics are concerned.

Figure 1:
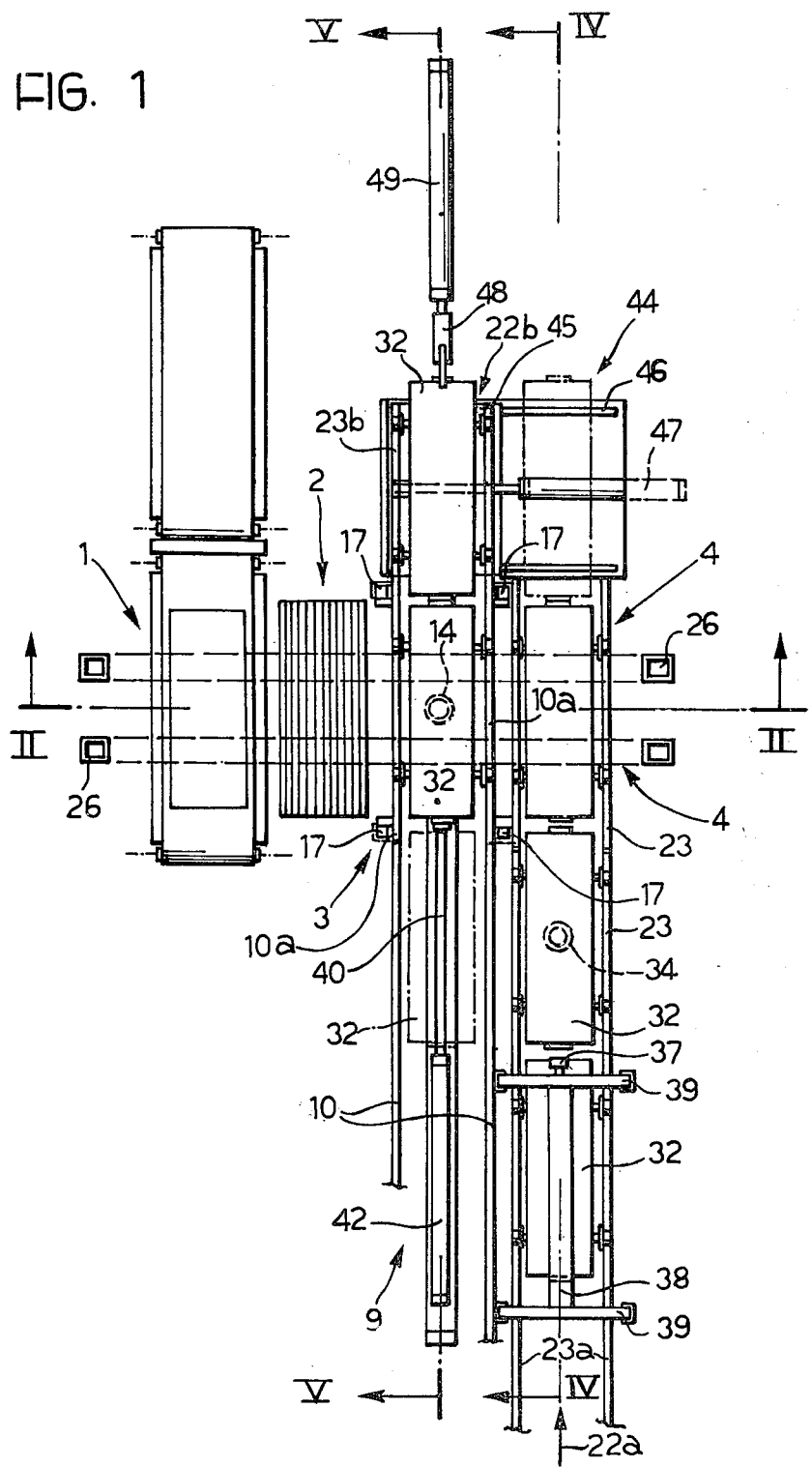
FIG. 1 is a schematic plan view of stacking apparatus embodying the invention.
Figure 2:
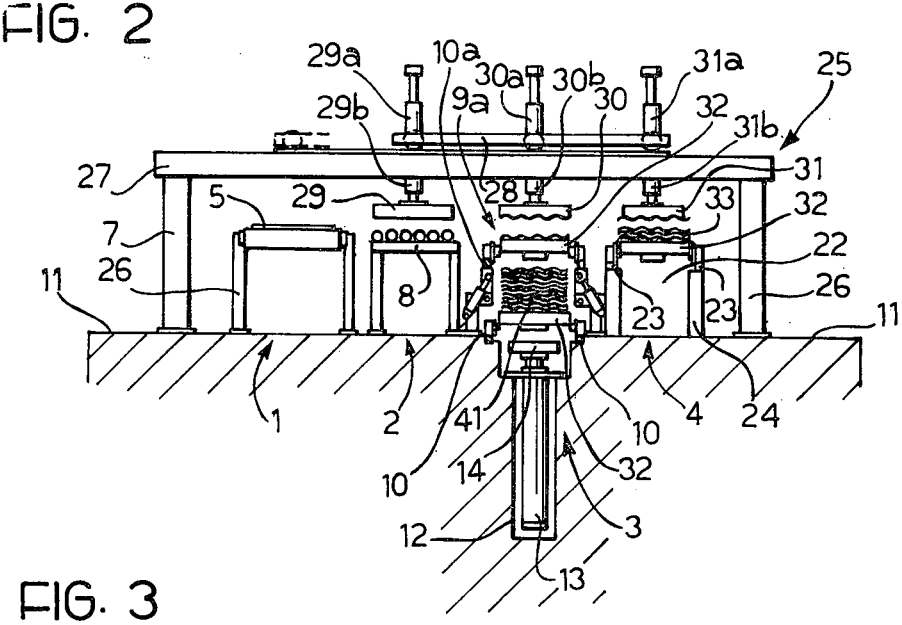
FIG. 2 is a schematic section along the line II—II of FIG. 1.

As can be seen from FIGS. 1 and 2, the apparatus includes an input station, generally indicated by 1, where fresh sheets of asbestos cement arrive from a forming machine (not shown), a corrugating station, generally indicated by 2, a stacking station where a mixed stack of sheets and plate-like patterns is formed, generally indicated by 3, and a station, generally indicated by 4, at which the patterns are picked up.

The input station 1 receives freshly made sheets 5 of asbestos cement on a belt conveyor 6 carried by suitable supports 7. The corrugating station 2 is provided with a known corrugator, schematically indicated by 8.

The stacking station 3 includes a guideway, generally indicated by 9, formed by the pair of parallel rails 10 set in the supporting floor 11 of the whole equipment. Between the rails 10, in an opening 12, there is located a conventional hydraulic cylinder 13 which operates an elevator 14 the function of which will be more closely described at a later stage.

Above the rails 10 which form the guideway 9, there is arranged a length of auxiliary guideway generally indicated by 9a, comprising a pair of parallel rails 10a. Each rail 10a is supported close to its ends on a pair of pivoted supports 15 which are hinged about horizontal pivot pins 16 carried at the ends of respective brackets 17 resting on the floor 11 outwardly of the rails 10.

Figure 3:
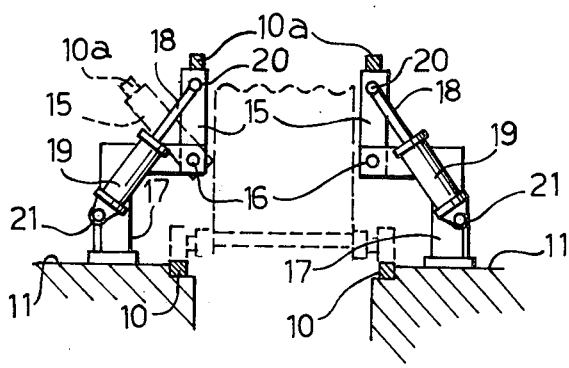
FIG. 3 is an enlarged detail of FIG. 2.

The supports 15 are connected by respective pins 20 to the rods 18 of respective hydraulic cylinders 19 which are connected by pins 21 to the brackets 17. By the action of the cylinders 19, the supports 15 can be moved angularly around the pivot pins 16 so as to assume the positions shown by dotted lines in FIG. 3, displaced angularly from the vertical positions shown by full lines, in which the rails 10a are separated by a greater distance than the rails 10.

The station 4 at which pattern plates are picked up for interleaving the fresh asbestos sheets 5 to form the mixed stack consists of a guideway 22 formed by a pair of parallel rails 23. The rails 23 are supported by pillars 24 and are disposed at substantially the same level, with respect to the floor 11, as the rails 10a of the auxiliary guideway 9a, when the supports 15 are vertical.

Above the stations 1, 2, 3 and 4, as shown, there is a bridge structure, generally indicated by 25, consisting of four vertical columns 26 and two horizontal cross-pieces 27.

The cross-pieces 27 support a mobile carriage 28 which is movable along the cross-pieces 27 by means of hydraulic controls, not shown. The carriage 28 supports three suction boxes indicated by 29, 30, 31 (FIG. 2). The suction box 29 serves to pick up the fresh asbestos sheets 5 from the input station 1 and place them on the corrugator 8; the suction box 30 serves to pick up the corrugated sheets from the corrugating station 2, and place them on the mixed stack at the stacking station 3, and the suction box 31 serves to pick up the patterns from the station 4, and to deposit them singly at the stacking station 3 for the formation of the mixed stack, the said patterns being alternated with the fresh corrugated asbestos sheets.

The raising and lowering of the suction boxes 29, 30 and 31 is effected conventionally by means of respective hydraulic cylinders 29a, 30a and 31a mounted on the carriage 28, the cylinders having respective moving elements which act on support rods of the respective suction boxes, indicated by 29b, 30b and 31b respectively.

As can be seen from FIG. 2, the carriage 28 traverses along the bridge structure 25 in both directions, moving a distance equal to the distance separating the centers of the neighbouring pairs of stations 1, 2 and 2, 3 as previously described.

Figure 4:
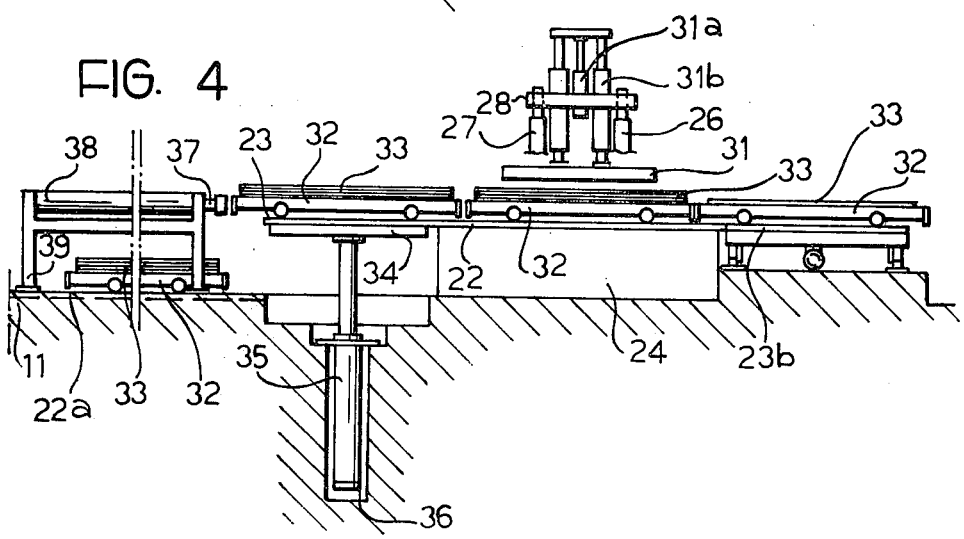
FIG. 4 is a longitudinal section along line IV—IV of FIG. 1.
Figure 5:
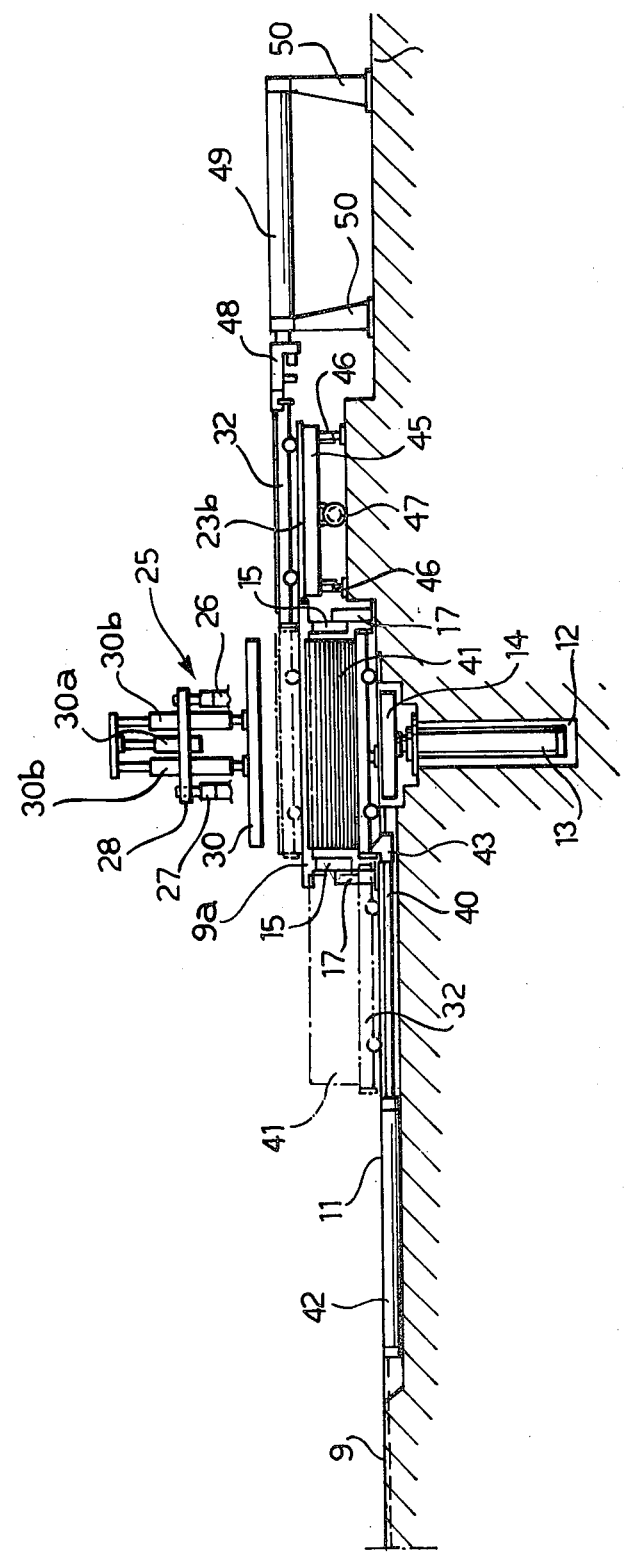
FIG. 5 is another schematic longitudinal section along line V—V of FIG. 1.

With particular reference to FIGS. 1, 4 and 5, it will be noted that the guideway 9 formed by the rails 10 extends at the level of the floor 11 beyond bridge structure 25, on one side thereof, for the purpose of removing the mixed stacks formed at the stacking station 3, with the assistance of a predetermined number of trolleys 32 which also serve to carry the patterns 33 to the station 4 for interleaving with the asbestos sheets 5.

The guideway 22, formed by the pair of rails 23 has an extension beyond the bridge structure 25, from the left hand side thereof as shown in FIG. 4, in the form of a section of guideway 22a, located at the level of the floor 11. Transit between the floor-level guideway section 22a and the guideway at a higher level, is achieved by means of an elevator 34 which is operated by a conventional hydraulic cylinder 35 located in a well 36 in the floor 11.

Trolleys 32, after loading with stacked patterns 33 at a stacking station (not shown), are raised from the guideway section 22a up to the guideway 22 by means of the elevator 34, the latter being, of course, provided with a section of the guideway 22 formed by portions of the pair of rails 23. The further advance of the trolleys 32, loaded with the pattern plates 33, from the raised elevator 24 to the station 4 is effected by means of a pusher 37, operated by a conventional hydraulic cylinder 38 mounted on a frame 39, the pusher 37 being located at the same level as the first raised guideway 22.

Similarly a pusher 40 is associated with the guideway 9 formed by the pair of rails 10, the pusher 40 being recessed between the rails 10 and arranged to move the trolleys loaded with a mixed stack 41 of sheets and patterns away from the station 3 to a conventional sheet seasoning station (not shown). The operation of the pusher 40 is effected by means of a conventional hydraulic cylinder indicated by 42. The pusher 40 acts on the trolleys 32 by means of a raised head 43 which engages one end of each trolley 32.

On the opposite side of the bridge structure 25 from the pusher 40 and the elevator 34 the apparatus is provided with a transfer mechanism, of a known type, generally indicated by 44. This mechanism consists of a platform 45 running on guideways 46 extending perpendicularly to the guideways 9 and 22 and movable along the guideways by the operation of an hydraulic cylinder 47.

The platform 45 is provided with a section of guideway 22b formed by rails 23b. In a first position of the platform 45 the guideway section 22b is in effect a prolongation of the guideway 22, whereas in a second position of platform 45, the same guideway section 22b is aligned with the auxiliary guideway 9a formed by the rails 10a and leading to the station 3 where the mixed stack is formed. By means of the transfer mechanism 44 the trolleys 32 when empty of all patterns, are transferred from the guideway 22 to the auxiliary guideway 9a.

In alignment with the auxiliary guideway 9a, the apparatus also includes a further pusher 48, operated by an hydraulic cylinder 49, located at the same level as the auxiliary guideway 9a, and supported by a framework 50 (FIG. 5).

OPERATION

The illustrated apparatus operates in the following manner.

The trolleys 32, each provided with a number of patterns 33, for example corrugated metal pattern plates, arrive at the stacking unit along the guideway 22a. In front of the bridge structure 25, the trolleys 32 are raised to the level of guideway 22 by means of the elevator 34 (FIG. 4). When so elevated the trolleys 32 are advanced by means of pusher 37 to a position directly beneath the bridge structure 25 at the station 4. At the same time, the trolley 32 which was previously at the station 4, having been emptied of all but one of the patterns 33, is displaced by the advancing loaded trolley 32 until it reaches the position illustrated in FIG. 4 on the platform 45 of the transfer mechanism 44. This trolley 32 remains in this position on the platform 45 pending transfer of the trolley to the auxiliary guideway 9a at the station 3, where the formation of the mixed stack 41 is effected. The changing of the pattern-carrying trolleys 32 is effected in this manner.

The formation of the mixed stack 41 at the station 3, and the changing of the trolleys 32 carrying the mixed stack 41 will now be described.

A trolley 32, provided with a single pattern 33, as described previously, is first brought into alignment with the auxiliary guideway 9a by means of the transfer mechanism 44 (FIG. 1). Subsequently, by means of the pusher 48 operated by the hydraulic cylinder 49, the trolley 32 is advanced onto the rails 10a of the auxiliary guideway 9a to a position directly beneath the bridge structure 25. During this movement, the rails 10a are kept in their raised position, directly above the rails 10 which form guideway 9 for the removal of the trolley after completion of the mixed stack 41 composed of interleaved sheets and patterns.

With the trolley 32 in this position, the apparatus can now start picking up fresh asbestos sheets, corrugate them and place them in correspondence with the station 3 to interleave them with patterns 33 picked up singly by means of the suction box 31 from the station 4, where another trolley 32, loaded only with stacked patterns, is located.

It will be supposed that under the auxiliary guideway 9a there is no trolley in engagement with the guideway 9: the elevator 14 is then raised until it engages the lower part of the trolley 32 which at this particular moment is resting on the auxiliary guideway 9a. At this moment, the pair of hydraulic cylinders 19 are operated so as to move the supports 15 of the rails 10a angularly apart: the trolley 32 is then released from the rails 10a of the auxiliary guideway 9a, and, as the sheets and patterns are placed on the trolley 32 to form the mixed stack 41, the trolley 32 is gradually lowered by the elevator 14, by suitable operation of the cylinder 13.

Upon completion of the mixed stack 41 composed of a predetermined number of sheets and pattern plates, the trolley 32 takes up the lower position, illustrated in FIG. 2, in which it engages the rails 10 forming guideway 9, located at the level of the floor 11.

At this moment, by a further operation of the pair of hydraulic cylinders 19, the rails 10a, are again raised into their operative positions vertically above the rails 10, so as to restore the guideway 9a. The station 3, under suction box 30 can, therefore, immediately receive a further trolley 32 provided with a single pattern plate 33, this further trolley having been brought, in the meantime, into alignment with the auxiliary guideway 9a of the transfer mechanism 44.

It follows that while the stacking apparatus can continue to place the sheets and pattern plates on the newly arrived trolley 32, the previous trolley loaded with the mixed stack can be removed from the station 3, by the action of the pusher 43 operated by the hydraulic cylinder 42, with more time being available for this operation than in conventional apparatus.

The changing of the trolleys carrying a mixed stack 41 can, therefore, occur without interrupting the operation of the stacking apparatus, and consequently, without loss of asbestos cement sheets, even if the rate of production of fresh sheets 5 is considerable.

The trolleys 32 with the mixed stacks 41, are finally conveyed along the guideway 9 to a seasoning store (not shown).

Even though the apparatus according to the invention has been described with reference to a stacking apparatus of the four-station type, it is clear that the invention can also be applied to apparatus having only three stations, for example an apparatus without the corrugation station 2, used for the manufacture of flat sheets, or an apparatus in which corrugation of the asbestos sheets takes place directly beneath the suction box 29, during the transfer from station 1, where the fresh sheets arrive, to station 3, where the mixed stack is formed.

I claim:

1. An apparatus for stacking sheets of asbestos cement interleaved with patterns, comprising feeding means for feeding fresh asbestos cement sheets, first and second flanking guideways for guiding respectively pattern-carrying trolleys and trolleys carrying mixed stacks of sheets interleaved with patterns, a bridge structure arranged above said guideways and said feeding means, a carriage displaceably mounted on the said bridge structure and provided with respective suction boxes for picking up, transporting and depositing the said sheets and the patterns, a trolley elevator in the area where the stacks of interleaved sheets and patterns are formed, wherein the improvement consists in the provision at the station where the mixed stack of sheets and patterns is formed on the respective trolley, under the bridge structure, of a section of auxiliary guideway, disposed above the second guideway for the mixed stack-carrying trolley, at a higher level than the maximum height attainable by the top of the mixed stack when said trolley is on said second guideway, a transfer mechanism for transferring said trolleys from the first guideway to the auxiliary guideway, and means for disengaging the section of auxiliary guideway from the trolley when the latter is engaged by the said elevator such that said elevator lowers the trolley onto the second guideway.

2. The apparatus defined in claim 1, wherein the said first guideway for the trolleys carrying the patterns, at least in the section under the bridge structure, and the section of guideway supported by the said transfer unit, are on the same level as the said section of auxiliary guideway.

3. The apparatus defined in claim 1, wherein the said section of auxiliary guideway consists of a pair of rails, and including respective supports carrying said auxiliary guideway rails and actuator means for moving said supports between a first position in which the rails are directly above the underlying guideway and form the said auxiliary guideway, and a second position in which the said rails are displaced apart from each other to allow the passage therebetween of a trolley supported by the said elevator.

4. The apparatus defined in claim 1, wherein the said guideway for the trolleys carrying the patterns is extended beyond the bridge structure with a section disposed at the lower level of the trolley elevator, below the guideway section which extends beneath the bridge structure, and including a further elevator for lifting the pattern carrying trolleys from the lower section of said guideway to the guideway section which extends beneath the bridge structure.

* * * * *